D. I. WINSLOW.
PAGE ARRANGEMENT FOR BOOKS.
APPLICATION FILED MAR. 10, 1919.
1,353,371. Patented Sept. 21, 1920.
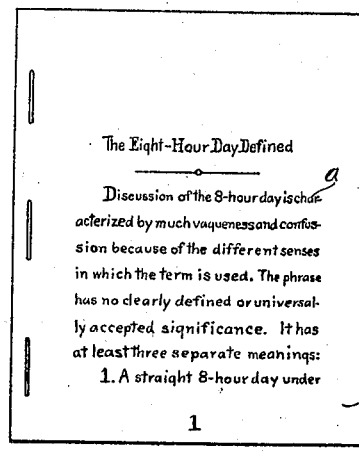
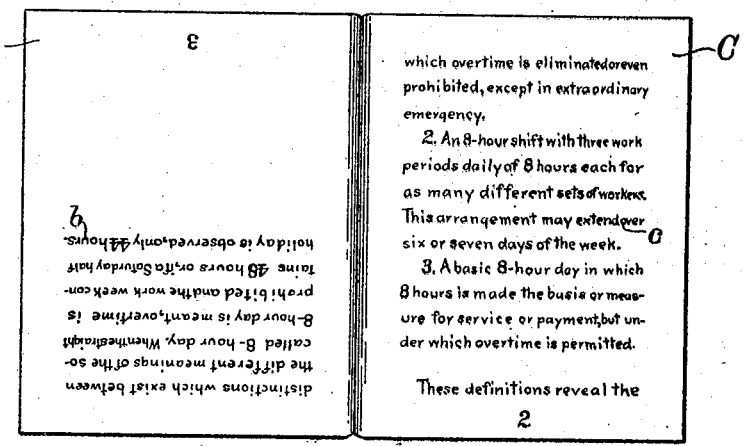
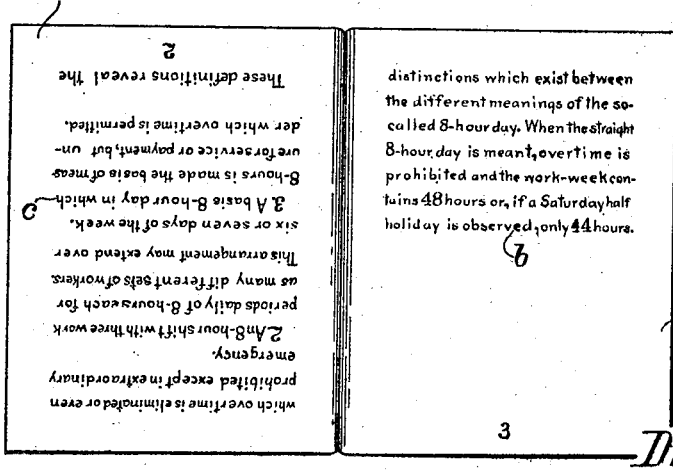
Inventor
Dion I. Winslow
By Edwin Guthrie,
Attorney

UNITED STATES PATENT OFFICE.

DION I. WINSLOW, OF BOSTON, MASSACHUSETTS.

PAGE ARRANGEMENT FOR BOOKS.

1,353,371.

Specification of Letters Patent. Patented Sept. 21, 1920.

Application filed March 10, 1919. Serial No. 281,590.

*To all whom it may concern:*

Be it known that I, DION I. WINSLOW, citizen of the United States, residing at Boston, in the county of Suffolk and State of Massachusetts, have invented certain new and useful Improvements in Page Arrangements for Books, of which the following is a specification.

This invention relates to page arrangements for books or pamphlets and sets forth a special arrangement of the printed matter in the make up of books whereby all pages being read are right hand pages, that is to say they lie toward the right hand of the reader. It is believed that a book constructed in accordance to this invention may be more conveniently and comfortably perused than books printed in the regular arrangement, for the reason that there is no necessity for changing the position of the head and neck, that the eyes readily keep to the lines while reading, that the book is held easier, that the eyes do not inadvertently wander to the left hand page, and that in a bulky book of relatively large size the points just outlined are particularly true and manifest.

The arrangement of the pages of a book in accordance with this invention is set forth in the accompanying drawings, of which Figure 1 represents the front page of the first printed leaf of a book or pamphlet comprising a plurality of leaves. Fig. 2 represents the book opened, and shows the printed matter on a succeeding leaf positioned in the same manner as the printed matter on the front page of the first printed leaf. In this figure is also shown the printed matter on the rear of a leaf in inverted position with respect to the printed matter on the front of the first printed leaf. Fig. 3 shows the book turned around so as to bring the originally inverted printed matter to the right hand and in position to be read in the usual way.

Throughout the drawings and description the same letter is employed to refer to the same part.

Consider the Fig. 1. The front page of the first printed is designated by the letter A and bears the printed matter *a*. The folder or book illustrated consists of two leaves, and in Fig. 2 the inside or rear page of the first leaf is marked B, and bears the printed matter *b*, which will be again referred to. The second leaf bears upon the inside page C the printed matter *c*. It will be observed in the drawings that the front page of the first printed leaf, and the front page of the succeeding printed leaf carry printed matter positioned in the same manner, and that the printed matter *b* on page B is inverted with respect to the printed matter on pages A and C.

While but two leaves are shown in the drawings, any number of leaves may be understood. On the front pages of succeeding leaves whatsoever their number, the printed matter is arranged in the same and customary manner and these pages are numbered in numerical order to the back of the book. The printed matter and page numbers are then continued in inverted positions from the back to the front of the book.

In the operation of this invention, let it be assumed that pages numbered 1 and 2 have been read. Now, if the book as illustrated in Fig. 2 be turned around into the position set forth in Fig. 3, the inverted page *b* becomes a right hand page with the printed matter in the usual place to be read without change of attitude of the head and eyes of the reader. As previously stated, in practice, with a heavy volume, the fact that the head and eyes may be kept steadily in substantially one position and need not change repeatedly to left and right, is found to be noticeably pleasanter and less fatiguing not only to the eyes, head and neck of the reader, but to the arms and hands by reason of the elimination of the repeated changes in the position of the book required for its suitable adjustment in order that the left hand pages may be read.

Having now described this invention and explained the mode of its operation, what I claim is:—

A page arrangement for a printed book, comprising a plurality of leaves bound together at the sides and having printed matter reading continuously on the front page of each leaf and the said pages being numbered successively from the front to the back of the book whereby the page being read is always next to the right hand of the reader holding the book, the said leaves having on the backs thereof printed matter in inverted position reading continuously from the back to the front of the book whereby when the book is inverted the page being read is always at the right hand of the reader as aforesaid.

In testimony whereof I affix my signature.

DION I. WINSLOW.